July 31, 1934.  E. H. KOCHER  1,968,044
LUBRICATION
Filed Jan. 2, 1931
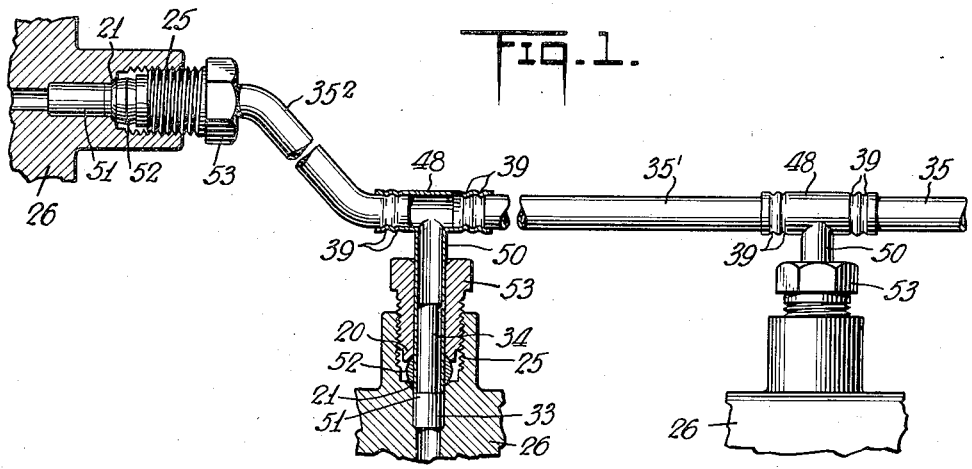
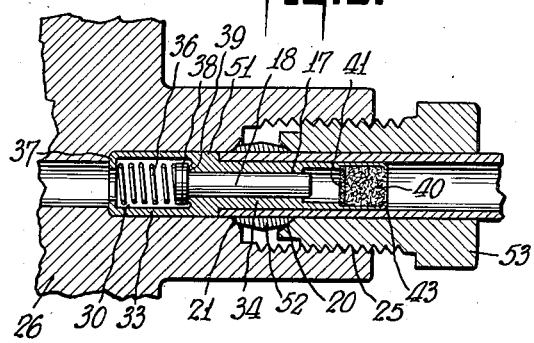
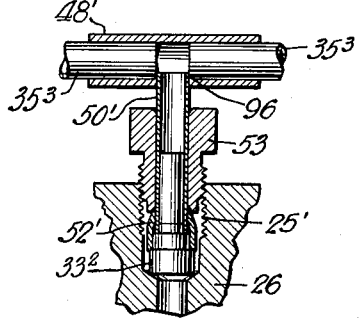
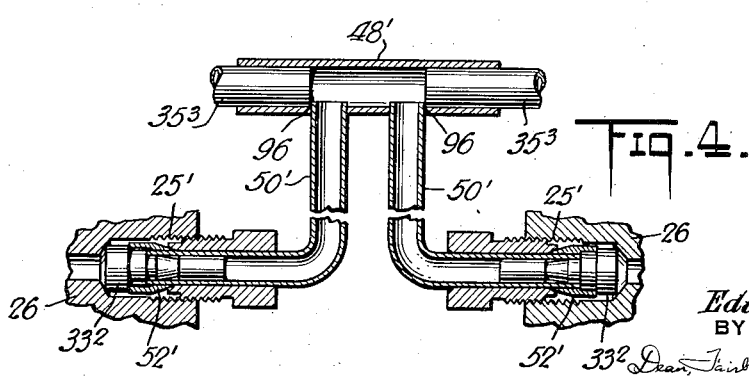
INVENTOR
*Edward H. Kocher*
BY
ATTORNEYS Patented July 31, 1934

1,968,044

UNITED STATES PATENT OFFICE 1,968,044

LUBRICATION

Edward H. Kocher, Boonton, N. J., assignor to Auto Research Corporation, a corporation of Delaware Application January 2, 1931, Serial No. 506,071

7 Claims. (Cl. 184—7)

My present invention relates primarily to liquid feeding and distributing installations, particularly installations involving T division arrangements, and while of more general application, has a preferred use in lubricating systems and a specific application to automobile chassis lubrication.

It is an object to provide an installation of the type mentioned, composed of simple elements easily associated with each other and easily applied to the structure mounting the installation, to provide a rugged, inobtrusive assembly unlikely to be disturbed even when employed on a moving apparatus, such as the chassis of an automobile, and which shall assure reliable distribution of the lubricant or other fluid in accordance with requirements at the various bearings to be supplied.

Another object is to provide flow dividing and controlling instrumentalities adjacent to the various outlets of a piping system which shall be compact, of low cost and which may be readily constructed in large part of standard copper or brass rod or tubing.

Another object is to provide a lubricant distributing system which lends itself to complete assembly as a separate article of manufacture and may be applied with facility and expedition to the lubricated apparatus.

Another object is to provide a lubricating installation, the T elements of which are conveniently installed with definite assurance that the arms of these T's shall extend along the length of the conduit when the T element is rigidly affixed with respect to the bearing or other carrying structure.

Other objects are in part obvious and in part pointed out hereinafter.

A feature of the present invention consists in eliminating junction fittings, particularly of the T type, as separate elements in lubricating systems and forming such junction elements from the copper or brass piping or tubing making up the major portion of the conduit system. In one embodiment a substantially unitary conduit or piping system may be preconstructed of a main conduit or pipe with a series of branches rigid therewith, which unitary assembly may be then attached to the bearings with facility and without the need for assembling the constituent parts of the system upon the lubricated structure.

Another feature resides in forming the flow controlling instrumentalities in such a way that they may be inserted within and be protected by the pipe sections and properly installed at and associated with the bearings in the process of connecting the pipe ends in place. In one embodiment, the flow control instrumentality may include a restriction plug of diameter such as may be readily inserted into the bore of the pipe outlet. Preferably the pipe outlets and the enclosed flow controlling instrumentalities are secured to the bearings or other sustaining structures by means of bushings encircling the same and acting on compression tapered coupling means to effect a tight joint.

In the accompanying drawing in which is shown one or more of the various possible embodiments of the features of this invention:

Fig. 1 is a fragmentary view of one form of a piping installation, partly in section, showing the junction arrangements and the cooperating restriction plugs;

Fig. 2 is an enlarged longitudinal sectional view of one of the restriction plugs; and Figs. 3 and 4 are fragmentary views of another form of a piping installation, partly in section, showing different types of junction arrangements and restriction plugs.

In Fig. 1 the piping system is formed of pipe sections 35, 35′ and 35², the adjacent ends of which are connected together by the encircling sleeves 48 which have stems 50 brazed or otherwise attached in corresponding openings between their ends. The pipe sections 35, the sleeves 48 and the stems 50 may be of seamless metal pipe or tubing, preferably copper. The ends of the sleeves 48 may be rolled inward at one or more places, as at 39, and/or soldered to connect the pipe sections securely in lubricant-tight relation, with stems 50 extending from between the adjacent ends of the pipe sections 35.

The stems 50 and also the external end of the last pipe section 35², are shown plugged with flow controlling restriction units 51, one of which is shown in section in Fig. 2. This typical plug or unit has an enlarged head 33, preferably of the same external diameter as the piping which is abutted by and forms a stop for the extremities of the stems 50 and the last pipe section 35². The shank 34 of the restriction plug is provided with a longitudinal bore 17 substantially filled by a restriction pin 18, said pin and bore being of accurately predetermined diameters to afford a minute or highly restricted outlet determining the rate of flow, the diameter or the length of the pin determining the rating thereof. In advance of this bore, a socket containing a felt strainer plug 40 with a wire mesh backing 41, said plug being held in position by a plurality of struck-in tongues 43. The shanks are preferably of substantially the same external diameters as the internal diameter of the piping so that they may be frictionally fitted within the ends of said pipe.

Within the enlarged head 33 of the restriction plug 51 is a socket 30, the inner portion of which is provided with a seat 39, against which is pressed a suitable check valve 38 by a coil compression spring 36, said spring being retained in place by the inwardly-turned rim 37 of the head 33.

Encircling the plugged pipe ends and attaching them to the tapped sockets 25 in the bearing structures 26 are the double tapered compression coupling sleeves 52 and the threaded bushings 53, said bushings and said sockets being provided with bevels 20 and 21, respectively, cooperating with the ends of said sleeve to clamp the pipe securely in position.

The method of applying a piping installation of the type shown in Fig. 1 will be readily understood. The length of piping is previously made up of the various T fittings 48—50 connecting individual pipe lengths 35. The restriction unit assemblies 51 are inserted into the corresponding branch stems 50, which latter are then inserted into the corresponding sockets in the lubricated structure, the threaded bushings 53 and compression sleeves 52 having previously been slipped over the free ends of said branch stems 50. The threaded bushings 53 are now tightened, which operation concurrently results in gripping the flow control cartridges and anchoring the branch stems 50, and thereby the entire length of piping, to the sustaining structure. The extremities of the pipe line are similarly applied, the control cartridge 51 being inserted into the pipe end, the threaded bushing and compression sleeve being slipped thereover, the pipe end being inserted into the socket therefor in the bearing and the threaded bushing being then threaded home.

In the embodiments of Figs. 3 and 4, the piping system is made by coupling together the adjacent ends of the pipe sections 35³ with sleeves 48', said sleeves being provided with stems 50' inserted through corresponding holes in the sides of said coupling sections 48' and brazed or soldered in place therein, the embodiment of Fig. 3 being provided with one of these stems and the embodiment of Fig. 4 being provided with two. The inwardly protruding extremities 96 of the T stems 50' constitute stops limiting the insertion of the pipe ends 35', thereby assuring that said pipe ends will not be inserted so far as to restrict the entry of lubricant to the T stem. In certain cases, if desired, the stems 50' may be applied directly to the main length of pipe rather than through a connecting T head or pipe coupling 48'.

The restriction plug assembly in the embodiment of Figs. 3 and 4 may be similar to that shown in Fig. 1 but illustratively the lower or valve end thereof is shown with an enlargement 33² against which the bevelled end of the compression coupling sleeve 52' abuts as distinguished from Fig. 2 where the abutment occurs with the mounting socket. The bushing may be substantially the same as in Fig. 2.

The present application is a continuation in part of applications, Serial No. 44,498 filed July 18, 1925 (now Patent No. 1,929,434, dated Oct. 10, 1933), and Serial No. 93,582 filed March 10, 1926 (now Patent No. 1,862,482, dated June 7, 1932).

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

I claim:—

1. A lubricating installation for a series of bearings comprising a pipe harness including a main lubricant conduit, a series of branch conduits rigidly attached to openings in the sides of the main conduit, restriction plugs in said branch conduits and means for attaching the ends of said branch conduits to the bearings, said conduits consisting exclusively of pipe sections devoid of pipe fitting threaded connections.

2. A lubricating installation for a series of bearings provided with tapped sockets comprising a main conduit, a series of branch conduits rigidly attached to said main conduit at openings in the sides thereof, restriction plugs in said branch conduits and cooperating tapered coupling sleeves and bushings coacting with said tapped sockets to mount the ends of the branch conduits upon the bearing structure.

3. A method of installing a lubricant installation upon a mechanism having a series of spaced socketed bearing elements which comprises providing a preassembled trunk and branch piping installation without threaded pipe fitting connections, the branches of which are so spaced and directed in relation to one another that the installation may be applied without change to the structure, inserting flow restricting plugs at the outlets of the preassembled structure and inserting the outlets of the preassembled structure into the sockets.

4. The method of applying a trunk and branch line lubricating system to a structure having a plurality of bearings, which method consists in preassembling the constituent parts of the trunk with branches of short length into a unitary construction without threaded pipe fitting connections, plugging said branches to control the distribution of lubricant therethrough and coupling said branches in tight relation to the respective bearings.

5. In a central lubricating installation for a mechanism having a plurality of spaced and distributed bearings to receive lubricant, each bearing including fixed and moving elements and each fixed element being provided with a tapped receiving socket, an integral unitary piping harness including a trunk line with a plurality of branches so spaced and positioned as to fit and register with said sockets, whereby said piping harness may be made as a unitary article of manufacture and installed in the installation by merely attaching the ends of the branches to the sockets.

6. A lubricating installation for a series of bearings comprising a pipe harness including a series of pipe sections forming a main conduit, another series of pipe sections serving to couple together the adjacent ends of said first mentioned pipe sections, a third series of pipe sections forming branch conduits and rigidly attached to said second mentioned pipe sections around openings in the sides thereof, cylindrical flow metering metal fittings enclosed in said third mentioned pipe sections and means for attaching the ends of said third mentioned pipe sections to the bearings, each of said bearings being provided with a tapped socket, and said flow metering fittings being inserted in said sockets and serving as abutments for the ends of said third mentioned pipe sections, said attaching means consisting of coupling nuts with central openings in which said pipe sections are received, said coupling nuts serving to assure a lubricant-tight connection between the pipe section and the flow metering fitting and between the fitting and the tapped socket.

7. In a central lubricating installation for a mechanism having a plurality of spaced and distributed bearings to receive lubricant, each bearing including fixed and moving elements and each fixed element being provided with a tapped receiving socket, an integral unitary piping harness including a trunk line with a plurality of branches so spaced and positioned as to fit and register with said sockets, whereby said piping harness may be made as a unitary article of manufacture and installed in the installation by merely attaching the ends of the branches to the sockets, each of said sockets being provided with a longitudinal lubricant metering fitting inserted therein and serving as an abutment for the end of said branch, and a coupling nut at the end of each branch threaded into said socket and being provided with a central opening receiving said branch end, said coupling nut forming a lubricant-tight connection between said pipe end and said lubricant metering fitting and holding said lubricant metering fitting tightly within said socket.

EDWARD H. KOCHER.